(12) United States Patent
Strandborg et al.

(10) Patent No.: US 12,248,624 B1
(45) Date of Patent: Mar. 11, 2025

(54) DISPLAY APPARATUS INCORPORATING ARTIFICIAL SACCADE ELONGATION

(71) Applicant: Varjo Technologies Oy, Helsinki (FI)

(72) Inventors: Mikko Strandborg, Helsinki (FI); Tarmo Räntilä, Helsinki (FI)

(73) Assignee: Varjo Technologies Oy, Helsinki (FI)

( * ) Notice: Subject to any disclaimer, the term of this patent is extended or adjusted under 35 U.S.C. 154(b) by 0 days.

(21) Appl. No.: 18/505,407

(22) Filed: Nov. 9, 2023

(51) Int. Cl.
*G06F 3/01* (2006.01)
*G09G 3/20* (2006.01)

(52) U.S. Cl.
CPC ............... *G06F 3/013* (2013.01); *G09G 3/20* (2013.01); *G09G 2340/0435* (2013.01); *G09G 2354/00* (2013.01)

(58) Field of Classification Search
CPC .. G06F 3/013; G09G 3/20; G09G 2340/0435; G09G 2354/00
See application file for complete search history.

(56) References Cited

U.S. PATENT DOCUMENTS

| | | | | |
|---|---|---|---|---|
| 2017/0068312 A1* | 3/2017 | Mallinson | ...... | H04N 21/234345 |
| 2017/0285735 A1* | 10/2017 | Young | ............ | G06F 3/013 |
| 2017/0285736 A1* | 10/2017 | Young | ............ | H04N 19/167 |
| 2017/0287112 A1* | 10/2017 | Stafford | ............ | G06F 3/013 |
| 2017/0287446 A1* | 10/2017 | Young | ............ | G09G 5/391 |
| 2019/0138088 A1* | 5/2019 | Evans | ............ | H04N 13/344 |
| 2019/0324276 A1* | 10/2019 | Edwin | ............ | G06V 20/20 |
| 2019/0354173 A1* | 11/2019 | Young | ............ | G06F 3/012 |
| 2019/0354174 A1* | 11/2019 | Young | ............ | G06N 3/044 |
| 2020/0081524 A1* | 3/2020 | Schmidt | ............ | G06F 3/013 |
| 2021/0132415 A1* | 5/2021 | Bhat | ............ | G02C 7/04 |
| 2021/0327030 A1* | 10/2021 | Ollila | ............ | G06T 5/70 |
| 2021/0373657 A1* | 12/2021 | Connor | ............ | G06T 5/90 |
| 2022/0130103 A1* | 4/2022 | Peuhkurinen | ............ | G06T 15/20 |
| 2022/0308666 A1* | 9/2022 | Eash | ............ | G06F 3/012 |
| 2023/0400911 A1* | 12/2023 | Ye | ............ | G06F 3/017 |
| 2024/0282126 A1* | 8/2024 | Debski | ............ | G06V 20/698 |

* cited by examiner

*Primary Examiner* — Amy Onyekaba
(74) *Attorney, Agent, or Firm* — Ziegler IP Law Group, LLC.

(57) ABSTRACT

A display apparatus includes eye-tracking means; display device(s); and processor(s) The processor is configured to process eye-tracking data collected by the eye-tracking means, to detect beginning time (T1) of a saccade (S) of user's eyes; control the display device(s) to display convoluted image for first time period (P1) during saccade (S); predict saccade end time (T2), wherein the first time period (P1) ends before the predicted saccade end time (T2); control the display device(s) to display the convoluted image for second time period (P2) starting before the predicted saccade end time (T2) to extend saccade until extended saccade end time (T3); and control the display device(s) to display an output image (402) after the second time period (P2), wherein the output image is an unconvoluted image.

13 Claims, 3 Drawing Sheets

DISPLAY APPARATUS INCORPORATING ARTIFICIAL SACCADE ELONGATION

TECHNICAL FIELD

The present disclosure relates to display apparatuses incorporating artificial saccade elongation. The present disclosure also relates to methods incorporating artificial saccade elongation.

BACKGROUND

Typically, as a person ages, a biological lens of her/his eye gradually loses some of its flexibility, which results in a gradual decline in an auto-focusing ability of the eye. Furthermore, the eye itself may be prone to straining, which results in issues such as soreness, tiredness, irritation, and the like, in the eye. Therefore, blurred vision, difficulty in focusing on objects at different distances, and eye straining are common issues faced by people.

Presently, existing techniques and equipment for improving a visual quality for displays of display devices have several limitations associated therewith. In this regard, characteristics of the display devices are dynamically adjusted when in operation. However, such adjustment takes some time to fully take place and be in effect. For example, such adjustment can take several hundreds of milliseconds (such as 100 ms, 150 ms, 200 ms, or similar) to take place. This adjustment is noticeable (i.e., perceivable) to the user, thereby adversely impacting a viewing experience of the user. Furthermore, depending on a magnitude of the adjustment of the optical characteristics, such an adjustment can be quite visually distracting to the user.

Therefore, in light of the foregoing discussion, there exists a need to overcome the aforementioned drawbacks.

SUMMARY

The aim of the present disclosure is to provide display apparatuses and methods incorporating artificial saccade elongation, to utilise the saccade for improving visual quality of the display apparatuses. The aim of the present disclosure is achieved by display apparatuses and methods which incorporate artificial saccade elongation as defined in the appended independent claims to which reference is made to. Advantageous features are set out in the appended dependent claims.

Throughout the description and claims of this specification, the words "comprise", "include", "have", and "contain" and variations of these words, for example "comprising" and "comprises", mean "including but not limited to", and do not exclude other components, items, integers or steps not explicitly disclosed also to be present. Moreover, the singular encompasses the plural unless the context otherwise requires. In particular, where the indefinite article is used, the specification is to be understood as contemplating plurality as well as singularity, unless the context requires otherwise.

DETAILED DESCRIPTION OF EMBODIMENTS

Figure 1:
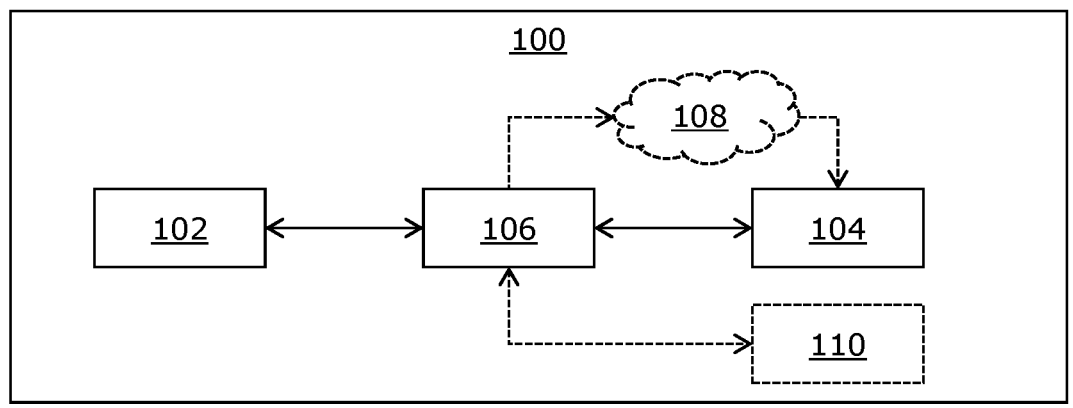
FIG. 1 illustrates a block diagram of an architecture of a display apparatus, in accordance with an embodiment of the present disclosure.

The following detailed description illustrates embodiments of the present disclosure and ways in which they can be implemented. Although some modes of carrying out the present disclosure have been disclosed, those skilled in the art would recognize that other embodiments for carrying out or practising the present disclosure are also possible.

In a first aspect, the present disclosure provides a display apparatus comprising:
  eye-tracking means;
  at least one display device;
  at least one processor, wherein the at least one processor is configured to:
    process eye-tracking data, collected by the eye-tracking means, to detect a beginning time (T1) of a saccade (S) of a user's eyes;
    control the at least one display device to display a convoluted image for a first time period (P1) during the saccade (S);
    predict a saccade end time (T2), wherein the first time period (P1) ends before the predicted saccade end time (T2);
    control the at least one display device to display the convoluted image for a second time period (P2) starting before the predicted saccade end time (T2) to extend the saccade until an extended saccade end time (T3); and
    control the at least one display device to display an output image after the second time period (P2), wherein the output image is an unconvoluted image.

In the aforementioned display apparatus incorporating artificial saccade elongation, the display apparatus is configured to display the convoluted image throughout the saccade or the extended saccade and then removed, when the output image is ready to be displayed. This provides a comfortable viewing experience to the user, as the output image (i.e., a sharp image) is displayed to the user as the saccade ends, in a simultaneous manner. Herein, the saccades can be easily detected using the eye-tracking means, which can be implemented with ease and is inexpensive. Furthermore, a potential delay of the at least one processor to control the at least one display device to display the output image is known in advance (i.e., predicted). Consequently, the convoluted image is continuously displayed to the user during the same saccade whose beginning is detected by the eye-tracking means, which does not adversely impact the viewing experience of the user, even when the saccade is artificially extended. Hence, the output image can be displayed properly to the user after the extended duration of the saccade; that is, the extended saccade end time is sufficient to display the output image to the user. The display apparatus can easily be implemented in various types of optical apparatuses, for example, such as a pair of glasses, a pair of sunglasses, smart glasses, a head-mounted display, or similar.

In a second aspect, the present disclosure provides a method implemented by a display apparatus comprising an eye-tracking means, at least one display device and at least one processor, wherein the method comprises:
- processing eye-tracking data, collected by the eye-tracking means, to detect a beginning time (T1) of a saccade (S) of a user's eyes;
- controlling the at least one display device to display a convoluted image for a first time period (P1) during the saccade (S);
- predicting a saccade end time (T2), wherein the first time period (P1) ends before the predicted saccade end time (T2);
- controlling the at least one display device to display the convoluted image for a second time period (P2) starting before the predicted saccade end time (T2) to extend the saccade until an extended saccade end time (T3); and
- controlling the at least one display device to display an output image after the second time period (P2), wherein the output image is an unconvoluted image.

In the aforementioned method incorporating artificial saccade elongation, the convoluted image is displayed throughout the saccade and the extended saccade and then removed, when the output image is ready to be displayed. This is performed in such a manner that a switch from the convoluted image to the output image is imperceptible to the user's eyes. Such imperceptibility is enabled synergistically by the aforementioned processing steps, since they derive technical benefits based on a fact that a potential delay of displaying the output image is known in advance (i.e., predicted). Consequently, the convoluted image is continuously displayed to the user during the same saccade whose beginning is detected, which does not adversely impact the viewing experience of the user, even when the saccade is artificially extended. Hence, the output image can be displayed properly to the user after extending a duration of the saccade; that is, the extended saccade end time is sufficient to display the output image to the user.

Throughout the present disclosure, the term "display apparatus" refers to a specialized equipment that is configured to present images and/or videos to a user when the display apparatus is in operation. The display apparatus acts as a device that is operable to present a visual scene of an environment (for example, such as an extended-reality environment) to the user.

Throughout the present disclosure, the term "eye-tracking means" refers to a specialized equipment that is employed to detect and/or follow a direction of gaze of the user of the optical apparatus, and to detect at least a beginning of a saccade of the user's eyes. The term "saccade" refers to a rapid eye motion when the user's eyes shift from one gaze region to other gaze region. In other words, the term "saccade" refers to a movement (for example, such as a horizontal movement, a vertical movement, and similar) of the user's eye when it shifts from one gaze region to other gaze region. The eye-tracking data comprises eye-tracking values that are related to and are indicative of a saccade of the eye. The saccade of the user's eye encompasses the beginning of the saccade, a duration of the saccade, and an ending of the saccade. The user's eyes undergo saccadic masking immediately after the beginning of the saccade and throughout the duration of the saccade. The eye-tracking data corresponding to each of these stages of the saccade of the user's eyes is different and distinctive from each other. Herein, the term "saccadic masking" refers to a phenomenon in in which the brain of the user suppresses visual perception during rapid eye movements. The saccadic masking facilitates maintaining a stability and a continuity of a visual experience of the user. It will be appreciated that regardless of the movement of the user's eyes, the saccadic masking in a visual cortex ends whenever a sharp image is produced on retina of the user's eyes.

Optionally, the eye-tracking means is implemented by way of at least one of: contact lenses having sensors, cameras monitoring features of the user's eyes. Such features may comprise at least one of: a shape of a pupil of the user's eye, a size of the pupil, corneal reflections of light emanating from a real-world environment from a surface of the user's eye, a relative position of the pupil with respect to the corneal reflections, a relative position of the pupil with respect to corners of the user's eye. Such eye-tracking means are well-known in the art. The eye-tracking means is configured to collect the eye-tracking data and send the eye-tracking data to the at least one processor. It will be appreciated that the eye-tracking data is collected repeatedly by the eye-tracking means throughout an operation of the display apparatus, as gaze of the user's eyes keeps changing whilst she/he uses the display apparatus. In an instance, when the eye-tracking means is implemented as the camera, the eye-tracking data is in form of images of the user's eyes. Herein, the beginning of the saccade may be detected when certain features (for example, such as position of pupils) of the user's eyes, shifts in the images of the user's eyes. In another instance, when the eye-tracking means is implemented by way of contact lenses having sensors, the eye-tracking data is the sensor data collected from the sensors.

Throughout the present disclosure, the term "display device" refers to a component that presents visual information to the user as images. The at least one display device is optionally positioned close to eyes of the user to create an immersive visual experience. The at least one display device could be implemented as any one of: a display, a combination of a projector and a projection screen setup. Examples of the display device may include, but are not limited to, a liquid crystal display (LCD) device, an organic light-emitting diode (OLED) display device, and a light-emitting diode (LED) display device.

It will be appreciated that the at least one processor is communicably coupled to the eye-tracking means and the at least one display device. The at least one processor could be implemented as any one of: a microprocessor, a microcontroller, or a controller. As an example, the at least one processor could be implemented as an application-specific integrated circuit (ASIC) chip or a reduced instruction set computer (RISC) chip.

The eye-tracking data is indicative of gaze directions, gaze velocities, gaze accelerations, and similar, of the user's eyes. Herein, the term "gaze direction" refers to a direction in which the user's eye is gazing. The gaze direction may be represented by a gaze vector. The term "gaze velocity" refers to an angular velocity with which the user's gaze is changing. The term "gaze acceleration" refers to an angular acceleration with which the user's gaze is changing. When processing the eye-tracking data, the at least one processor is configured to employ at least one of: an image processing algorithm, a feature extraction algorithm, a data processing algorithm. Other suitable algorithm(s) can also be employed, depending on a type of the eye-tracking data. A technical effect of processing the eye-tracking data to detect the beginning of the saccade of the user's eyes is that the at least one display device can be controlled by the at least one processor to display a convoluted image in a required manner, thereby allowing to artificially elongate the saccade.

Optionally, the beginning of the saccade of the user's eyes is detected when the gaze velocities of the user's eyes are higher than a first predefined threshold. Optionally, the first predefined threshold lies in a range of 30 degrees per second to 90 degrees per second. The first predefined threshold lies in a range of 30, 35, 40, 50 or 70 degrees per second to 45, 60, 80, 85, 90 degrees per second. A technical effect of detecting the beginning of the saccade in such a manner is that it improves a real-time response of the display apparatus as compared to conventional display apparatuses, which reduces an overall latency of the display apparatus. Beneficially, this proves an immersive experience for the user.

The at least one display device is controllable (for example, using electrical signals) to display the convoluted image to the user within the first time period (P1). Herein, the first time period may be a millisecond, a second, and similar. Throughout the present disclosure, the term "convoluted image" refers to an image that is hard to perceive or is unclear to the user's eyes. Herein, the term "convoluted image" encompasses "blurred image", "distorted image", "complex image", "intricate image", and the like. In this regard, an end time of the saccadic masking is artificially controlled by displaying the convoluted image to the user's eyes during the saccade and after the saccade is predicted to end. Herein, the convoluted image is shown to the user to continue the saccade, as visual information will only start to get processed by the brain of the user once an unconvoluted image (in other words, a sharp image) is formed at a retina of the user's eyes. Notably, the convoluted image is displayed by the at least one display device to ensure that the user is seeing the convoluted image when the saccade (S) is nearing its end and pupils of the user's eyes slow down. This ensures that the saccade does not end prematurely by the user's eyes, and that the eyes accidentally see a high-contrast content being displayed by the at least one display device. The at least one processor is configured to display the convoluted image at any time instant within the first time period. Herein, the first time period starts from the beginning time of the saccade of the user's eyes, and ends before the predicted saccade end time (as is described later).

Optionally, the first time period lies in a range of 0 millisecond to 20 milliseconds. The first time period lies in a range of 0, 2, 5, 10 or 15 milliseconds to 6, 11, 16, 18 or 20 milliseconds. A technical effect of the first time period is that it enables synchronizing the displaying of the convoluted image with the duration of the saccade, by controlling the at least one display device during the saccade.

The saccade end time (T2) is predicted by the at least one processor to determine a requirement to artificially elongate the saccade. Beneficially, by predicting the saccade end time, a visual quality of the user's eyes (that are continuously tracked by the eye-tracking means for determining direction of gaze of the user's eyes) for the at least one display device is improved as compared to conventional display devices. Moreover, the saccade end time is predicted so that the convoluted image is at least displayed to the user during the first time period.

Optionally, the predicted saccade end time (T2) is predicted based on at least one of: the eye-tracking data, an average frequency at which the previous saccades of the user's eyes have occurred, a predefined frequency at which saccades are known to occur in users. In this regard, when determining the average frequency, previously-recorded time instants (i.e., previously-recorded moments in time) of occurrence of the previous saccades are analysed, and these previously-recorded time instants are used to determine the average time interval between the previous saccades, as mentioned above. A reciprocal of the average time interval between the previous saccades is equal to the average frequency of the previous saccades. For example, the average frequency of the previous saccades may be an average number of previous saccades per minute. When determining the predefined frequency at which the saccades are known to occur in users, the eye-tracking data is processed to determine a frequency at which the previous saccades have occurred, by tracking the movements of the user's eyes and detecting the beginning of saccadic movement. The saccade end time (T2) is predicted simply using, for example, at least one mathematical formula. Subsequently, the at least one processor is configured to employ a prediction algorithm to predict the saccade end time (T2), based on the eye-tracking data.

The at least one display device is controllable to display the convoluted image for the second time period (P2). Herein, the second time period may be a millisecond, a second, and similar. The at least one processor is configured to display the convoluted image before the predicted saccade end time starts, till the extended saccade end time (T3), which extends the duration of the saccade. By presenting the convoluted image during the saccade that lasts up to the extended saccade end time, the user's brain might perceive the saccade as lasting longer than it actually does. Herein, the term "extended saccade end time" refers to a time instant when the user's brain perceives that the saccade is ending, even though a saccadic movement of the user's eyes is concluded. Optionally, the convoluted image is displayed to synchronize the user's eyes to a display scanout of the at least one display device. Herein, the term "display scanout" refers to updating pixels of the convoluted image in a line by line manner, as the visual information will begin to be processed by the brain once sharp image is formed at the retina. In this regard, the user's eyes can sense the sharp image when light emanating from the sharp image falls on foveas of the user's eyes.

Optionally, the second time period (P2) lies in an entire duration of the saccade. In this regard, the second time period can lie in a range of 0 millisecond to 100 milliseconds. The second time period lies in a range of 0, 10, 20, 40 or 80 milliseconds to 30, 50, 70, 90 or 100 milliseconds. A technical effect of the second time period is that it facilitates controlling the at least one display device in such a manner that the convoluted image is displayed during the artificial elongation of the saccade.

The at least one display device is controllable to display the output image after the extended saccade end time is over. A technical effect of controlling the at least one display device in such a manner is that a visually comfortable and coherent viewing experience is provided to the user, by minimizing any potential visual disruptions or artifacts associated with rapid eye movements. When the output image is displayed to the user's eyes, it means that the saccadic masking is over. This is possible even when this happens in a middle of a saccadic eye motion.

Optionally, the at least one processor is further configured to:
  determine a current latency of a communication network over which output images to be displayed on the at least one display device are received;
  estimate an arrival time (Ta) of the output image, based on the latency of the communication network and a frame rate of at least one graphics processor that generates the output images;
  estimate a display time (Td) of the output image, based on the arrival time and a display processing latency ($\Delta t1$);

determine whether an image delivery latency is present, wherein the image delivery latency is present when one of the following is true: the arrival time (Ta) of the output image is later than the predicted saccade end time (T2), the arrival time (Ta) of the output image is before the predicted saccade end time (T2) but the display time (Td) of output image is later than the predicted saccade end time (T2);

when it is detected that the image delivery latency is present, determine the second time period (P2) according to the image delivery latency.

In this regard, saccade is elongated when the saccade ends or is about to end but the output image is not ready for displaying. A technical effect of configuring the at least one processor in such a manner is that the viewing experience of the user is comfortable as the output image is displayed to the user only when said output image is ready, by artificially elongating the saccade to the extended saccade end time.

The term "communication network" refers to an arrangement of interconnected programmable and/or non-programmable components that are configured to facilitate communication between the at least one processor and the at least one display device.

The term "current latency" refers to an amount of time it takes for the output images to travel from a source (for example, such as a memory where the output images are stored) to a destination (i.e., the at least one display device) within the communication network at the particular time. It will be appreciated that latency of the communication network fluctuates over time. Hence, the at least one processor is configured to determine the current latency of the communication network at a particular time. Furthermore, the current latency represents a delay or a lag that occurs at the particular time when the output images traverse the communication network to be displayed on the at least one display device. The current latency is measured in milliseconds (ms).

The term "arrival time" refers to a time at which the (next) output image arrives at the at least one display device. The arrival time (Ta) of the output image is estimated by adding the current latency and a reciprocal of the frame rate of the at least one graphics processor. Herein, the frame rate is a measure of a number of output images (or frames) the at least one graphics processor can generate and output per second. The frame rate of the at least one graphics processor is pre-known to the at least one processor (from use, from pre-set operational specifications, or similar). Optionally, the at least one graphics processor is communicably coupled to the at least one processor. Optionally, at least one server comprises the at least one graphics processor. Herein, the at least one graphics processor processes the frame rate in an accelerated manner in real time and improves execution speed of various machine learning models.

The term "display time" refers to a time at which the (next) output image is to be displayed. The term "display processing latency" refers to a time taken for the at least one processor to process the output images and display it on the at least one display device. This display processing latency occurs due to forward error correction of the output image, video decoding, display vertical synchronization (vsync), and similar. The display time is estimated as a summation of the arrival time and the display processing latency. A technical effect of estimating the display time is that it facilitates synchronization between the arrival of the output images and the actual display of the output images on the at least one display device.

The term "image delivery latency" refers to a delay that occurs between an initiation of a process to deliver the output images to the at least one display device and a moment when the output images are actually displayed on the at least one display device. When the arrival time (Ta) of the output image is later than the predicted saccade end time (T2), this means that the next image frame might not arrive in time for end of the saccade, for example, $Ta=T2+\Delta t2$, wherein $\Delta t2$ is another display processing latency of the (next) output image. Notably, upon late arrival of the output image, the output image is subject to display processing latency ($\Delta t2$), which may or may not be nil. When the arrival time (Ta) of the output image is before the predicted saccade end time (T2) but the display time (Td) of output image is later than the predicted saccade end time (T2), this means that the next image frame arrives in time for real end of the saccade, but the display processing latency is such that it does not get displayed in time by the end of the saccade. For example, $Ta=T2-\Delta t3$ but the display processing latency is $\Delta t1$, and it is such that $Td=T2-\Delta t3+\Delta t1$ is later than T2 (or basically, $\Delta t1$ is greater than $\Delta t3$). Herein, $\Delta t3$ is yet another display processing latency of the output image succeeding the (next) output image. Consequently, the second time period takes into account the display latency, the image delivery latency, the estimated display time of the output image. The second time period can be longer than a minimally required second time periods.

In an embodiment, the second time period (P2) is determined according to the image delivery latency, such that:

the second time period is equal to or greater than a time period between the predicted saccade end time (T2) and the arrival time (Ta) of the output image, when the arrival time of the output image is later than the predicted saccade end time, and the display processing latency ($\Delta t1$) is nil, the second time period is equal to or greater than a time period between the predicted saccade end time (T2) and the display time (Td) of the output image, when the arrival time (Ta) of the output image is later than the predicted saccade end time, and the display processing latency ($\Delta t1$) is not nil, or the second time period is equal to or greater than a time period between the predicted saccade end time (T2) and the display time (Td) of the output image, when the arrival time (Ta) of the output image is before the predicted saccade end time but the display time of output image is later than the predicted saccade end time.

A technical effect of determining the second time period in such a manner is that it ensures that the at least one display device is synchronized with the actual arrival of the output image, thereby compensating for the current latency in the communication network.

In a first embodiment, the output image arrives later than the expected saccade end time, possibly due to the current latency. There is no significant delay as the display processing latency is nil, thereby the at least one processor is configured to control the at least one display device in such a manner that the output image immediately displayed, once the output image arrives at the at least one display device.

In a second embodiment, the output images arrives later than the expected saccade end time, due to the current latency in the communication network. Hence, there is a significant delay as the display processing latency is not nil, thereby the at least one processor is configured to control the at least one display device in such a manner that the output image is not available to be displayed immediately upon arrival. Hence, the output image is displayed after the display processing latency.

In a third embodiment, the output image arrives earlier than the expected saccade end time. However, the output image is not displayed immediately upon arrival but is scheduled to be displayed later. To ensure that the output image is displayed at the correct time and does not appear too early, the second time period is set to cover the time between the predicted saccade end time and the display latency. Hence, the at least one processor is configured to control the at least one display device in such a manner that the output image is displayed later than the predicted saccade end time.

Optionally, the output image comprises at least one first image segment and at least one second image segment, the at least one first image segment having a higher sharpness than the at least one second image segment, and wherein the output image is ready for displaying at a given time during the second time period (P2), the at least one processor is further configured to:
- process the eye-tracking data, collected by the eye-tracking means, to determine gaze directions of the user's eyes at the given time;
- determine, in the output image, a gaze point at the given time, based on the gaze directions of the user's eyes at the given time;
- determine whether a distance (D) between the gaze point and a next transition boundary (TB3) in the output image is greater than a first predefined distance, wherein the next transition boundary in the output image is determined as a boundary between a first image segment and a second image segment according to a striped rendering scheme of the output image;
- when it is determined that the distance between the gaze point and the next transition boundary in the output image is greater than the first predefined distance, adjust the extended saccade end time (T3) to be at the given time.

In this regard, the output image is rendered by employing a striped rendering scheme. Herein, the output image is divided into the at least one first image segment and the at least one second image segment in a horizontal manner or a vertical manner. The at least one first image segment and the at least one second image segment are distributed evenly across the frame, ensuring that each of the at least one first image segment and the at least one second image segment represents a portion of the output image. The higher sharpness of the at least one first image segment when compared to the at least one second image segment implies that the at least one first image segment is detailed, has clarity, and has clear edges. The lower sharpness of the at least one second image segment when compared to the at least one first image segment implies that the at least one second image segment is less detailed, fewer fine details and edges as compared to the at least one first image segment. A technical effect of the output image comprising the at least one first image segment and the at least one second image segment is that a balance is achieved between visual quality and performance of processing resources. Herein, the second time period of artificial saccade elongation is already ongoing (i.e., the convoluted image is already being shown) when the output image becomes ready for displaying. Optionally, the output image may be received during the second time period and may not require any processing by the at least one processor before being displayed by the at least one display device. Alternatively, optionally, by default, the artificial saccade extension is performed, during which the output image becomes ready for displaying. In this case, the output image may be received before the end of the saccade or during the second time period.

Herein, the term "gaze direction" refers to a direction in which the user's eyes is gazing. The gaze direction may be represented by a gaze vector. The "gaze point" is a point in the real-world environment at which the user's gaze is focused. The gaze point is a point of interest of the user, in the output image at the given time. Optionally, the gaze point is determined by mapping the gaze directions of the user's eyes to a corresponding point in the output image at the given time, at which the gaze directions converge.

Herein, the distance (D) represents a spatial gap between the gaze point and the next transition boundary within the output image. A unit of the distance may be pixels, millimetres, and similar. The term "transition boundary" refers to a boundary between the at least one first image segment and the at least one second image segment. Optionally, the first predefined distance lies in a range of 2 degrees to 20 degrees of visual angle. The first predefined distance lies in a range of 2, 5, 10 or 15 degrees of the visual angle to 8, 13, 18 or 20 degrees of the visual angle. Herein, the term "visual angle" refers to an angle formed at the user's eyes, wherein a vertex of the visual angle is located at the user's eye, and sides of the visual angle extends from the user's eyes to a boundary of the at least one first image segment or the at least one second image segment. For example, the first predefined distance may be 5 degrees. The distance between the gaze point and the next transition boundary in the output image may be 10 degrees. Consequently, the distance between the gaze point and the next transition boundary in the output image is greater than the first predefined distance, the saccade end time is adjusted to be at the given time.

When the at least one processor employs the striped rendering scheme, a switch from the convoluted image to the output image can be made at any time, optionally during the display scanout, even in a middle of the frame, as long as the user's gaze is not near the transition boundary at the given time. When the distance between the gaze point and the next transition boundary in the output image is greater than the first predefined distance, the saccade ends at the given time. When the saccade ends at the given time, the at least one processor is configured to control the at least one display device to immediately display the output image by removing the convoluted image, even in the middle of the frame. When the distance between the gaze point and the next transition boundary in the output image is less than or equal to the first predefined distance, the saccade is extended. Furthermore, the switch from the convoluted image to the output image may be postponed by one or more of the at least one first image segment and the at least one second image segment. A technical effect of displaying the output image in such a manner is that the switch from the convoluted image to the output image is made in a manner which does not cause any visual discomfort to the user. Optionally, the at least one display device is implemented as a variable refresh rate display device, wherein the at least one processor is configured to control the variable refresh rate display device to simultaneously display the output image when the saccade or the artificially extended saccade ends. A technical effect of controlling the variable refresh rate display device in such a manner is that it reduces a discomfort (i.e., nausea, headache, and similar) of the user when the display apparatus is worn by the user on his/her head (for example, such as the XR headset).

In an embodiment, when it is determined that the distance (D) between the gaze point and the next transition boundary in the output image is not greater than the first predefined distance, the at least one processor is configured to adjust the extended saccade end time (T3) to be at:

a time at which the gaze point is predicted to lie within the first predefined distance from any further transition boundary succeeding the next transition boundary, wherein said further transition boundary is determined based on the striped rendering scheme of the output image; a next synchronization time between a frame rate of at least one graphics processor that generates the output image and a refresh rate of the at least one display device.

In this regard, the extended saccade end time is adjusted based on the gaze point and a position of the next transition boundary and the further transition boundary. A technical effect of adjusting the extended saccade end time in such a manner is that this enhances a visual quality of the output image by minimising any occurrence of abrupt changes in sharpness of the output image occurring near the gaze point during or after the saccadic movement. Herein, the distance between the gaze point and the next transition boundary in the output images is less than or equal to the first predefined distance, which means that the user's gaze is near the next transition boundary. For example, if the next transition boundary is TB3, then the further transition boundary is TB4.

Optionally, when the time at which the gaze point is predicted to lie within the first predefined distance from any further transition boundary succeeding the next transition boundary, the at least one processor is further configured to:

determine at least one further transition boundary succeeding the next transition boundary, using the striped rendering scheme of the output image;

process the eye-tracking data to determine at least one of: the gaze velocity, the gaze acceleration, at the given time;

predict at least one time when the gaze point would lie within the first predefined distance from the at least one further transition boundary, based on the gaze point at the given time, and at least one of: the gaze velocity, the gaze acceleration, at the given time.

Optionally, the extended saccade end time also considers synchronization with the frame rate of the at least one graphics processor generating the output image and refresh rate of the at least one display device. Herein, the term "refresh rate" refers to a rate at which the at least one display device refreshes the display of the at least one display device to display the output image. A technical effect of adjusting the extended saccade end time with the timing between the frame rate and the refresh rate is that, it facilitates aligning the extended saccade with a natural flow of rendering of the output image and the refresh rate of the display. Beneficially, this creates a visually consistent experience for the user.

The present disclosure also relates to the second aspect as described above. Various embodiments and variants disclosed above, with respect to the aforementioned first aspect, apply mutatis mutandis to the second aspect. The method is implemented by a display apparatus comprising an eye-tracking means, at least one display device and at least one processor.

Optionally, the method further comprises:

determining a current latency of a communication network over which output images to be displayed on the at least one display device are received;

estimating an arrival time (Ta) of the output image, based on the latency of the communication network and a frame rate of at least one graphics processor that generates the output images;

estimating a display time (Td) of the output image, based on the arrival time and a display processing latency (Δt1);

determining whether an image delivery latency is present, wherein the image delivery latency is present when one of the following is true: the arrival time (Ta) of the output image is later than the predicted saccade end time (T2), the arrival time (Ta) of the output image is before the predicted saccade end time (T2) but the display time (Td) of output image is later than the predicted saccade end time (T2); and when it is detected that the image delivery latency is present, determining the second time period (P2) according to the image delivery latency.

A technical effect of determining the second time period according to the image delivery latency is that a viewing experience of the user is comfortable as the output image is displayed to the user, only when said output image is ready, by artificially elongating the saccade to the extended saccade end time.

In an embodiment, the second time period (P2) is determined according to the image delivery latency, such that:

the second time period is equal to or greater than a time period between the predicted saccade end time (T2) and the arrival time (Ta) of the output image, when the arrival time of the output image is later than the predicted saccade end time, and the display processing latency (Δt1) is nil, the second time period is equal to or greater than a time period between the predicted saccade end time (T2) and the display time (Td) of the output image, when the arrival time (Ta) of the output image is later than the predicted saccade end time, and the display processing latency (Δt1) is not nil, or the second time period is equal to or greater than a time period between the predicted saccade end time (T2) and the display time (Td) of the output image, when the arrival time (Ta) of the output image is before the predicted saccade end time but the display time of output image is later than the predicted saccade end time.

A technical effect of determining the second time period in such a manner is that it ensures that the displaying with the output image is synchronised with the actual arrival of the output image, thereby compensating for the current latency in the communication network.

Optionally, the output image comprises at least one first image segment and at least one second image segment, the at least one first image segment having a higher sharpness than the at least one second image segment, and wherein the output image is ready for displaying at a given time during the second time period (P2), the method further comprising:

processing the eye-tracking data, collected by the eye-tracking means, to determine gaze directions of the user's eyes at the given time;

determining, in the output image, a gaze point at the given time, based on the gaze directions of the user's eyes at the given time;

determining whether a distance (D) between the gaze point and a next transition boundary in the output image is greater than a first predefined distance, wherein the next transition boundary in the output image is determined as a boundary between a first image segment and a second image segment according to a striped rendering scheme of the output image; and when it is determined that the distance between the gaze point and the next transition boundary in the output image is greater than the first predefined distance, adjusting the extended saccade end time (T3) to be at the given time.

A technical effect of the output image comprising the at least one first image segment and the at least one second image segment is that a balance is achieved between visual quality and performance of processing resources.

In an embodiment, when it is determined that the distance (D) between the gaze point and the next transition boundary in the output image is not greater than the first predefined distance, the method comprising adjusting the extended saccade end time (T3) to be at:

a time at which the gaze point is predicted to lie within the first predefined distance from any further transition boundary succeeding the next transition boundary, wherein said further transition boundary is determined based on the striped rendering scheme of the output image; a next synchronization time between a frame rate of at least one graphics processor that generates the output image and a refresh rate of the at least one display device.

A technical effect of adjusting the extended saccade end time in such a manner is that this enhances a visual quality of the output image by minimising any occurrence of abrupt changes in sharpness of the output image occurring near the gaze point during or after the saccadic movement. A technical effect of adjusting the extended saccade end time with the timing between the frame rate and the refresh rate is that, the extended saccade is aligned with a natural flow of rendering of the output image and the refresh rate of the display. Beneficially, this creates a visually consistent experience for the user.

DETAILED DESCRIPTION OF THE DRAWINGS

Referring to FIG. 1, there is illustrated a block diagram of an architecture of a display apparatus 100, in accordance with an embodiment of the present disclosure. The display apparatus 100 comprises an eye-tracking means 102, at least one display device (depicted as a display device 104), and at least one processor (depicted as a processor 106). The processor 106 is communicably coupled with the eye-tracking means 102 and the display device 104. Optionally, the processor 106 is communicably coupled with the display device 104 via a communication network 108. Optionally, the processor 106 is communicably coupled with at least one graphics processor 110.

FIG. 1 is merely an example, which should not unduly limit the scope of the claims herein. A person skilled in the art will recognize many variations, alternatives, and modifications of embodiments of the present disclosure.

Figure 2:
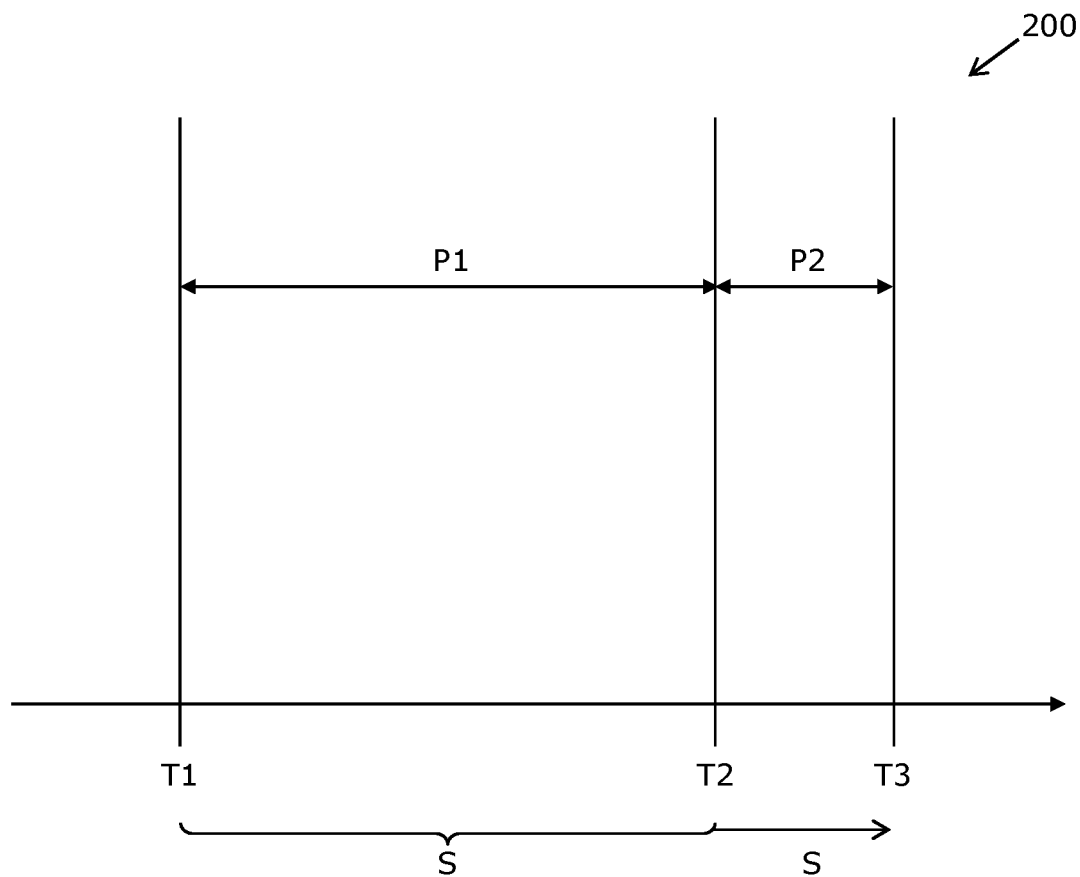
FIG. 2 illustrates a graphical representation of artificial saccade elongation, in accordance with an embodiment of the present disclosure.

Referring to FIG. 2, there is illustrated a graphical representation 200 of artificial saccade elongation, in accordance with an embodiment of the present disclosure. The graphical representation 200 is in a form of graph whose horizontal axis represent time in seconds. A beginning time T1 of a saccade S corresponds to a time instant when the beginning of the saccade S of a user's eyes is detected. A saccade end time T2 corresponds to a time instant when the end time of the saccade S is predicted. An extended saccade end time T3 corresponds to a time instant when the saccade S of the user's eyes is extended. A first time period P1 starts from the beginning time T1 of the saccade S to the predicted saccade end time T2, wherein the first time period P1 corresponds to a time period in which at least one processor is configured to control at least one display device to display a convoluted image during the saccade S. A second time period P2 starts before the predicted saccade end time T2 and extends till the extended saccade end time T3.

FIG. 2 is merely an example, which should not unduly limit the scope of the claims herein. A person skilled in the art will recognize many variations, alternatives, and modifications of embodiments of the present disclosure.

Figure 3A:
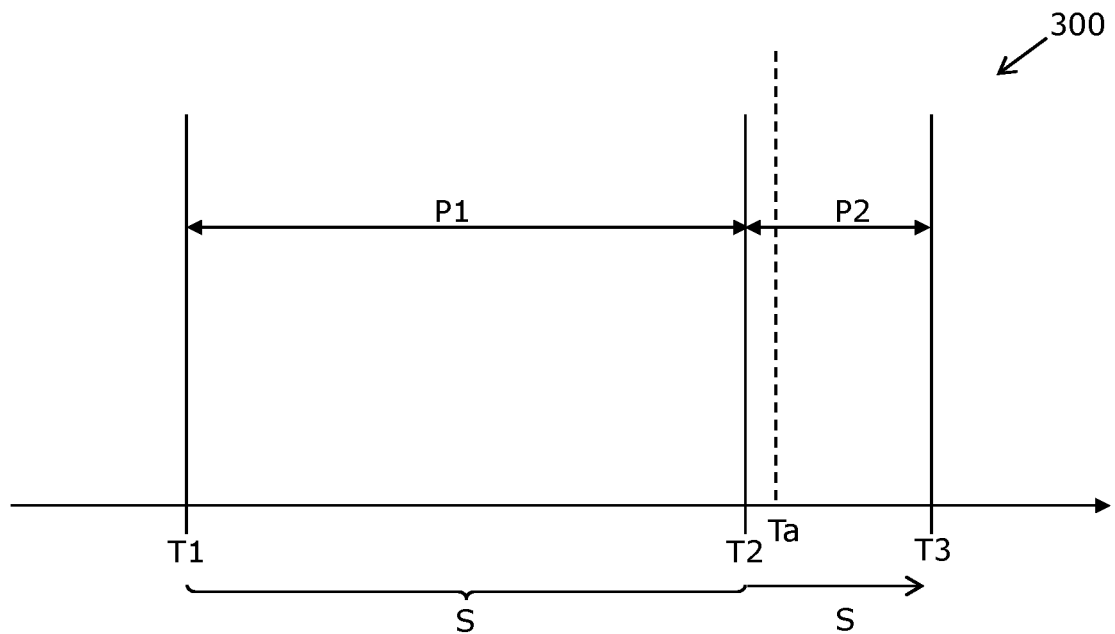
FIGS. 3A and 3B illustrate graphical representations using FIG. 2, of optional latency cases when an image delivery latency is present, in accordance with an embodiment of the present disclosure.
Figure 3B:
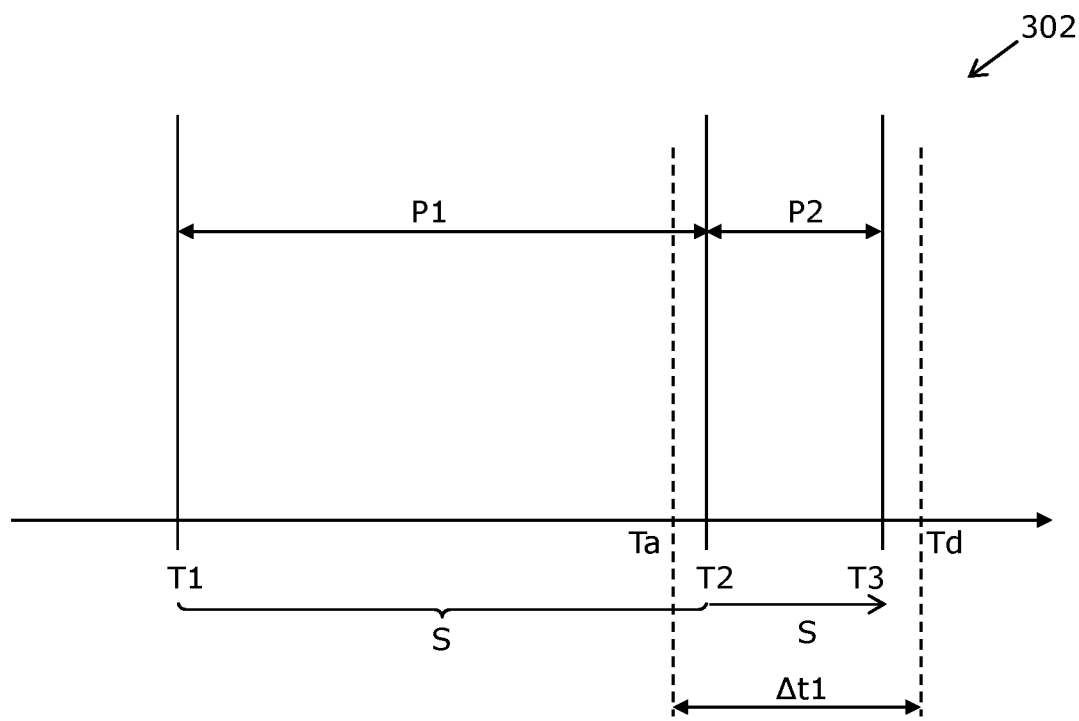

Referring to FIGS. 3A and 3B, there are illustrated graphical representations 300 and 302 using FIG. 2, of optional latency cases when an image delivery latency is present, in accordance with an embodiment of the present disclosure. In FIGS. 3A and 3B, the graphical representations 300 and 302 are in form of graphs whose horizontal axes represent time in seconds. Herein, an arrival time Ta of the output image corresponds to a time instant when the output image arrives at the at least one display device. FIG. 3A illustrates a case of the image delivery latency when the arrival time Ta of the output image is later than the predicted saccade end time T2.

In FIG. 3B, a display time Td of the output image corresponds to a time instant when the output image is displayed at the at least one display device, wherein the display time Td is estimated based on the arrival time Ta and a display processing latency Δt1. FIG. 3B illustrates a case of the image delivery latency when the arrival time Ta is before the predicted saccade end time T2 but a display time Td of the output image is later than the predicted saccade end time T2.

FIGS. 3A-B are merely examples, which should not unduly limit the scope of the claims herein. A person skilled in the art will recognize many variations, alternatives, and modifications of embodiments of the present disclosure.

Figure 4:
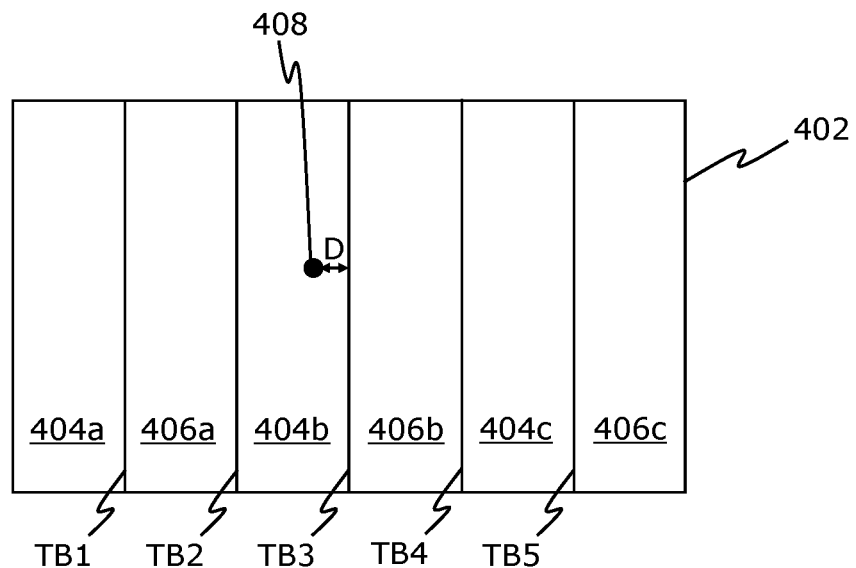
FIG. 4 illustrate an output image which is rendered according to a striped rendering scheme, in accordance with an embodiment of the present disclosure.

Referring to FIG. 4, there is illustrated an output image 402 which is rendered according to a striped rendering scheme, in accordance with an embodiment of the present disclosure. The output image comprises at least one first image segment (depicted as first image segments 404a, 404b, and 404c) and at least one second image segment (depicted as second image segments 406a, 406b, and 406c). The first image segments 404a, 404b, and 404c have a higher sharpness than the second image segments 406a, 406b, and 406c. A transition boundary is present between each first image segment and the second image segment according to the striped rendering scheme of the output image 402. For example, a transition boundary TB1 is present between the first image segment 404a and the second image segment 406a, a transition boundary TB2 is present between the second image segment 406a and the first image segment 404b, a transition boundary TB3 is present between the first image segment 404b and the second image segment 406b, a transition boundary TB4 is present between the second image segment 406b and the first image segment 404c, and a transition boundary TB5 is present between the first image segment 404c and the first image segment 406c. A distance D is determined between the gaze point 408 and any of the transition boundary TB1-4. For example, the distance D is determined between the gaze point 408 and the transition boundary TB3.

FIG. 4 is merely an example, which should not unduly limit the scope of the claims herein. A person skilled in the art will recognize many variations, alternatives, and modifications of embodiments of the present disclosure.

Figure 5:
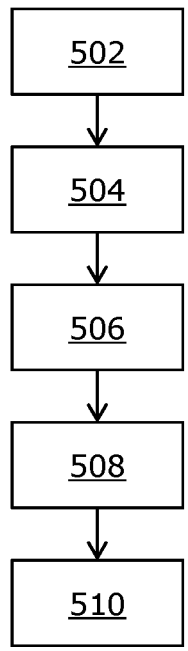
FIG. 5 illustrate steps of a method incorporating artificial saccade elongation, in accordance with an embodiment of the present disclosure.

Referring to FIG. 5, illustrated are steps of a method incorporating artificial saccade elongation, in accordance with an embodiment of the present disclosure. At step 502, eye-tracking data, collected by the eye-tracking means, is processed to detect a beginning time (T1) of a saccade of a user's eyes. At step 504, the at least one display device is controlled to display a convoluted image for a first time period (P1) during the saccade. At step 506, a saccade end time (T2) is predicted, wherein the first time period (P1) ends before the predicted saccade end time (T2). At step 508, the at least one display device is controlled to display the convoluted image for a second time period (P2) starting before the predicted saccade end time (T2) to extend the saccade until an extended saccade end time (T3). At step 510, the at least one display device is controlled to display an output image after the second time period (P2), wherein the output image is an unconvoluted image.

The aforementioned steps are only illustrative and other alternatives can also be provided where one or more steps are added, one or more steps are removed, or one or more steps are provided in a different sequence without departing from the scope of the claims herein.

The invention claimed is:

1. A display apparatus comprising:
   eye-tracking means;
   at least one display device;
   at least one processor, wherein the at least one processor is configured to:
      process eye-tracking data, collected by the eye-tracking means, to detect a beginning time (T1) of a saccade (S) of a user's eyes;
      control the at least one display device to display a convoluted image for a first time period (P1) during the saccade;
      predict a saccade end time (T2), wherein the first time period (P1) ends before the predicted saccade end time;
      control the at least one display device to display the convoluted image for a second time period (P2) starting before the predicted saccade end time to extend the saccade until an extended saccade end time (T3); and
      control the at least one display device to display an output image after the second time period, wherein the output image is an unconvoluted image.

2. The display apparatus of claim 1, wherein, the at least one processor is further configured to:
   determine a current latency of a communication network over which output images to be displayed on the at least one display device are received;
   estimate an arrival time (Ta) of the output image, based on the latency of the communication network and a frame rate of at least one graphics processor that generates the output images;
   estimate a display time (Td) of the output image, based on the arrival time and a display processing latency (Δt1);
   determine whether an image delivery latency is present, wherein the image delivery latency is present when one of the following is true: the arrival time (Ta) of the output image is later than the predicted saccade end time (T2), the arrival time (Ta) of the output image is before the predicted saccade end time but the display time (Td) of output image is later than the predicted saccade end time (T2); and
   when it is detected that the image delivery latency is present, determine the second time period (P2) according to the image delivery latency.

3. The display apparatus of claim 2, wherein the second time period (P2) is determined according to the image delivery latency, such that:
   the second time period is equal to or greater than a time period between the predicted saccade end time (T2) and the arrival time (Ta) of the output image, when the arrival time of the output image is later than the predicted saccade end time, and the display processing latency (Δt1) is nil,
   the second time period is equal to or greater than a time period between the predicted saccade end time (T2) and the display time (Td) of the output image, when the arrival time (Ta) of the output image is later than the predicted saccade end time, and the display processing latency (Δt1) is not nil, or
   the second time period is equal to or greater than a time period between the predicted saccade end time (T2) and the display time (Td) of the output image, when the arrival time (Ta) of the output image is before the predicted saccade end time but the display time of output image is later than the predicted saccade end time.

4. The display apparatus of claim 1, wherein the output image comprises at least one first image segment and at least one second image segment, the at least one first image segment having a higher sharpness than the at least one second image segment, and wherein the output image is ready for displaying at a given time during the second time period (P2), the at least one processor is further configured to:
   process the eye-tracking data, collected by the eye-tracking means, to determine gaze directions of the user's eyes at the given time;
   determine, in the output image, a gaze point at the given time, based on the gaze directions of the user's eyes at the given time;
   determine whether a distance (D) between the gaze point and a next transition boundary (TB3) in the output image is greater than a first predefined distance, wherein the next transition boundary in the output image is determined as a boundary between a first image segment and a second image segment according to a striped rendering scheme of the output image; and
   when it is determined that the distance between the gaze point and the next transition boundary in the output image is greater than the first predefined distance, adjust the extended saccade end time (T3) to be at the given time.

5. The display apparatus of claim 4, wherein when it is determined that the distance (D) between the gaze point and the next transition boundary (TB3) in the output image is not greater than the first predefined distance, the at least one processor is configured to adjust the extended saccade end time (T3) to be at:
   a time at which the gaze point is predicted to lie within the first predefined distance from any further transition boundary (TB4, TB5) succeeding the next transition boundary, wherein said further transition boundary is determined based on the striped rendering scheme of the output image;
   a next synchronization time between a frame rate of at least one graphics processor that generates the output image and a refresh rate of the at least one display device.

6. The display apparatus of claim 1, wherein the second time period (P2) lies in a range of 0 millisecond to 100 milliseconds.

7. The display apparatus of claim 1, wherein the first time period (P1) lies in a range of 0 millisecond to 20 milliseconds.

8. The display apparatus of claim 1, wherein the predicted saccade end time (T2) is predicted based on at least one of: the eye-tracking data, an average frequency at which previous saccades of the user's eyes have occurred, a predefined frequency at which saccades are known to occur in users.

9. A method implemented by a display apparatus comprising an eye-tracking means, at least one display device and at least one processor, wherein the method comprises:
   processing eye-tracking data, collected by the eye-tracking means, to detect a beginning time (T1) of a saccade (S) of a user's eyes;
   controlling the at least one display device to display a convoluted image for a first time period (P1) during the saccade;
   predicting a saccade end time (T2), wherein the first time period (P1) ends before the predicted saccade end time;
   controlling the at least one display device to display the convoluted image for a second time period (P2) starting before the predicted saccade end time (T2) to extend the saccade until an extended saccade end time (T3); and
   controlling the at least one display device to display an output image after the second time period (P2), wherein the output image is an unconvoluted image.

10. The method of claim 9, further comprising:
    determining a current latency of a communication network over which output images to be displayed on the at least one display device are received;
    estimating an arrival time (Ta) of the output image, based on the latency of the communication network and a frame rate of at least one graphics processor that generates the output images;
    estimating a display time (Td) of the output image, based on the arrival time and a display processing latency ($\Delta t1$);
    determining whether an image delivery latency is present, wherein the image delivery latency is present when one of the following is true: the arrival time (Ta) of the output image is later than the predicted saccade end time (T2), the arrival time of the output image is before the predicted saccade end time but the display time (Td) of output image is later than the predicted saccade end time; and
    when it is detected that the image delivery latency is present, determining the second time period (P2) according to the image delivery latency.

11. The method of claim 10, wherein the second time period (P2) is determined according to the image delivery latency, such that:
    the second time period is equal to or greater than a time period between the predicted saccade end time (T2) and the arrival time (Ta) of the output image, when the arrival time of the output image is later than the predicted saccade end time, and the display processing latency ($\Delta t1$) is nil,
    the second time period is equal to or greater than a time period between the predicted saccade end time and the display time (Td) of the output image, when the arrival time of the output image is later than the predicted saccade end time, and the display processing latency ($\Delta t1$) is not nil, or
    the second time period is equal to or greater than a time period between the predicted saccade end time and the display time of the output image, when the arrival time of the output image is before the predicted saccade end time but the display time of output image is later than the predicted saccade end time.

12. The method of claim 9, wherein the output image comprises at least one first image segment and at least one second image segment, the at least one first image segment having a higher sharpness than the at least one second image segment, and wherein the output image is ready for displaying at a given time during the second time period (P2), the method further comprising:
    processing the eye-tracking data, collected by the eye-tracking means, to determine gaze directions of the user's eyes at the given time;
    determining, in the output image, a gaze point at the given time, based on the gaze directions of the user's eyes at the given time;
    determining whether a distance (D) between the gaze point and a next transition boundary (TB3) in the output image is greater than a first predefined distance, wherein the next transition boundary in the output image is determined as a boundary between a first image segment and a second image segment according to a striped rendering scheme of the output image; and
    when it is determined that the distance between the gaze point and the next transition boundary in the output image is greater than the first predefined distance, adjusting the extended saccade end time (T3) to be at the given time.

13. The method of claim 12, wherein when it is determined that the distance (D) between the gaze point and the next transition boundary (TB3) in the output image is not greater than the first predefined distance, the method comprising adjusting the extended saccade end time (T3) to be at:
    a time at which the gaze point is predicted to lie within the first predefined distance from any further transition boundary (TB4, TB5) succeeding the next transition boundary, wherein said further transition boundary is determined based on the striped rendering scheme of the output image;
    a next synchronization time between a frame rate of at least one graphics processor that generates the output image and a refresh rate of the at least one display device.

* * * * *